(12) United States Patent
Lim et al.

(10) Patent No.: US 11,560,457 B2
(45) Date of Patent: *Jan. 24, 2023

(54) MDO THERMORESISTANT HEAT-SHRINKABLE FILM

(71) Applicant: SK CHEMICALS CO., LTD., Gyeonggi-do (KR)

(72) Inventors: Seol-Hee Lim, Seoul (KR); Sung-Gi Kim, Gyeonggi-do (KR); So-Yeon Kim, Daejeon (KR)

(73) Assignee: SK Chemicals Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/344,101

(22) PCT Filed: Nov. 24, 2017

(86) PCT No.: PCT/KR2017/013544
§ 371 (c)(1),
(2) Date: Apr. 23, 2019

(87) PCT Pub. No.: WO2018/097655
PCT Pub. Date: May 31, 2018

(65) Prior Publication Data
US 2020/0062954 A1 Feb. 27, 2020

(30) Foreign Application Priority Data
Nov. 24, 2016 (KR) .................. 10-2016-0157612

(51) Int. Cl.
| | |
|---|---|
| *C08J 7/043* | (2020.01) |
| *B32B 27/08* | (2006.01) |
| *B32B 27/18* | (2006.01) |
| *B32B 27/36* | (2006.01) |
| *C08L 67/02* | (2006.01) |
| *C08G 63/183* | (2006.01) |
| *C08G 63/199* | (2006.01) |
| *B29D 7/01* | (2006.01) |
| *C08G 63/127* | (2006.01) |
| *C08G 63/672* | (2006.01) |
| *B29C 55/06* | (2006.01) |
| *B29L 31/00* | (2006.01) |
| *C08G 63/137* | (2006.01) |
| *B29K 105/02* | (2006.01) |
| *B29K 7/00* | (2006.01) |
| *C08J 5/18* | (2006.01) |

(52) U.S. Cl.
CPC .............. *C08J 7/043* (2020.01); *B32B 27/08* (2013.01); *B32B 27/18* (2013.01); *B32B 27/36* (2013.01); *C08L 67/02* (2013.01); *B29C 55/06* (2013.01); *B29D 7/01* (2013.01); *B29K 2007/00* (2013.01); *B29K 2105/02* (2013.01); *B29L 2031/744* (2013.01); *B32B 2250/02* (2013.01); *B32B 2250/03* (2013.01); *B32B 2250/244* (2013.01); *B32B 2250/40* (2013.01); *B32B 2255/10* (2013.01); *B32B 2307/31* (2013.01); *B32B 2307/514* (2013.01); *B32B 2307/516* (2013.01); *B32B 2307/736* (2013.01); *B32B 2309/105* (2013.01); *B32B 2519/00* (2013.01); *C08G 63/127* (2013.01); *C08G 63/137* (2013.01); *C08G 63/183* (2013.01); *C08G 63/199* (2013.01); *C08G 63/672* (2013.01); *C08J 5/18* (2013.01); *C08J 2367/02* (2013.01); *C08L 2203/16* (2013.01); *Y10T 428/31786* (2015.04)

(58) Field of Classification Search
None
See application file for complete search history.

(56) References Cited

U.S. PATENT DOCUMENTS

| | | | | |
|---|---|---|---|---|
| 4,939,232 A | * | 7/1990 | Fukuda | C08J 5/18 528/272 |
| 4,987,187 A | | 1/1991 | Udipi et al. | |
| 5,958,581 A | * | 9/1999 | Khanarian | C08J 5/18 264/177.17 |
| 6,025,061 A | * | 2/2000 | Khanarian | C08G 63/668 428/221 |

(Continued)

FOREIGN PATENT DOCUMENTS

| | | |
|---|---|---|
| CN | 103172990 | 6/2013 |
| JP | H 04-344222 | 11/1992 |

(Continued)

OTHER PUBLICATIONS

International Search Report and Written Opinion for International (PCT) Patent Application No. PCT/KR2017/013544, dated Feb. 12, 2018, 13 pages.

(Continued)

*Primary Examiner* — Vivian Chen
(74) *Attorney, Agent, or Firm* — Sheridan Ross P.C.

(57) ABSTRACT

The present invention relates to an MDO heat-shrinkable film of a copolymer polyester having excellent thermal resistance. In particular, the present invention provides a copolymer polyester MDO (machine direction orientation) thermoresistant heat-shrinkable film that consists of a copolymer polyester resin including isosorbide and 1,4-cyclohexanedimethanol at an optimized content ratio as a diol component copolymerized with an acid component including terephthalic acid, and having a number average molecular weight of 18,000 g/mol or more, and can be used for labels, cap seals, direct packaging, etc. of various containers due to the high shrink initiation temperature.

11 Claims, No Drawings

(56) References Cited

U.S. PATENT DOCUMENTS

| | | | |
|---|---|---|---|
| 6,368,710 B1* | 4/2002 | Hayes | C08G 63/668 428/357 |
| 9,169,365 B2* | 10/2015 | Lee | B29C 55/08 |
| 9,676,903 B2* | 6/2017 | Lee | C08G 63/672 |
| 11,396,579 B2* | 7/2022 | Lee | C08K 5/098 |
| 2002/0115817 A1* | 8/2002 | Hayes | B32B 27/36 528/295.3 |
| 2003/0068453 A1* | 4/2003 | Kong | B32B 27/32 428/35.2 |
| 2003/0232960 A1* | 12/2003 | Adelman | C08G 63/672 528/272 |
| 2007/0104931 A1 | 5/2007 | Ito et al. | |
| 2009/0227735 A1* | 9/2009 | Shih | C08J 5/18 525/190 |
| 2009/0270584 A1 | 10/2009 | Endo et al. | |
| 2011/0251342 A1* | 10/2011 | Park | C08G 63/672 524/710 |
| 2012/0177854 A1* | 7/2012 | Lee | G06F 8/65 428/35.7 |
| 2012/0226014 A1* | 9/2012 | Lee | C08J 5/18 528/298 |
| 2013/0008821 A1* | 1/2013 | Haruta | C08J 5/18 206/459.5 |
| 2015/0141612 A1* | 5/2015 | Lee | C08G 63/199 528/281 |
| 2015/0148515 A1* | 5/2015 | Kim | C08G 63/863 528/281 |
| 2015/0197598 A1* | 7/2015 | Kim | C08K 5/49 528/279 |
| 2015/0221439 A1 | 8/2015 | Grosrenaud et al. | |
| 2015/0337080 A1* | 11/2015 | Bhattacharjee | C08G 63/672 528/298 |
| 2015/0343746 A1* | 12/2015 | Bhattacharjee | B32B 27/28 428/480 |
| 2015/0353692 A1* | 12/2015 | Bhattacharjee | C08J 5/18 528/298 |
| 2016/0122536 A1* | 5/2016 | Sohn | C08K 5/005 523/436 |
| 2016/0222156 A1* | 8/2016 | Bhattacharjee | C08L 67/02 |
| 2016/0222157 A1 | 8/2016 | Lee et al. | |
| 2017/0144420 A1* | 5/2017 | Lim | B32B 27/36 |
| 2018/0162616 A1* | 6/2018 | Inoue | B32B 27/28 |
| 2018/0355101 A1* | 12/2018 | Jacquel | C08J 5/18 |
| 2019/0161259 A1* | 5/2019 | Amedro | C08J 5/18 |
| 2019/0194407 A1* | 6/2019 | Amedro | B29C 55/005 |
| 2019/0329538 A1* | 10/2019 | Lim | B32B 27/08 |

FOREIGN PATENT DOCUMENTS

| | | |
|---|---|---|
| JP | 4411556 | 2/2010 |
| JP | 2011-025961 | 2/2011 |
| JP | 2011-513550 | 4/2011 |
| JP | 2013-504650 | 2/2013 |
| JP | 5235494 | 7/2013 |
| JP | 2013-202939 | 10/2013 |
| JP | 2013-202939 A * | 10/2013 |
| JP | 2013-202940 | 10/2013 |
| JP | 2015-229242 | 12/2015 |
| JP | 2018-034425 | 3/2018 |
| KR | 10-2001-0034805 | 4/2001 |
| KR | 10-0933242 | 12/2009 |
| KR | 10-1169749 | 7/2012 |
| KR | 10-1219525 | 1/2013 |
| KR | 10-2014-0092113 | 7/2014 |
| KR | 2014-0092113 A * | 7/2014 |
| KR | 10-1435694 | 9/2014 |
| KR | 10-1468937 | 12/2014 |
| KR | 10-2015-0117954 | 10/2015 |
| KR | 10-1639629 | 7/2016 |
| WO | WO 2015/150073 | 10/2015 |
| WO | WO 2015/156489 A * | 10/2015 |

OTHER PUBLICATIONS

Extended Search Report for European Patent Application No. 17872962.0, dated Apr. 29, 2020, 10 pages.
Official Action for U.S. Appl. No. 16/344,120, dated Jun. 19, 2020 7 pages Restriction Requirement.
Official Action for U.S. Appl. No. 16/344,120, dated Oct. 13, 2020 10 pages.
Official Action for U.S. Appl. No. 16/344,120, dated Apr. 13, 2021 10 pages.
Official Action for U.S. Appl. No. 16/344,120, dated Aug. 24, 2021 7 pages.
Official Action for U.S. Appl. No. 16/344,120, dated Dec. 15, 2021 9 pages.
Advisory Action for U.S. Appl. No. 16/344,120, dated Mar. 29, 2022 4 pages.
Official Action for U.S. Appl. No. 16/344,120, dated Sep. 7, 2022, 9 pages.

* cited by examiner

MDO THERMORESISTANT HEAT-SHRINKABLE FILM

CROSS-REFERENCE TO RELATED APPLICATION

This application is a national stage application under 35 U.S.C. 371 and claims the benefit of PCT Application No. PCT/KR2017/013544 having an international filing date of 24 Nov. 2017, which designated the United States, which PCT application claimed the benefit of Korean Patent Application No. 10-2016-0157612 filed on Nov. 24, 2016 with the Korean Intellectual Property Office, the disclosure of each of which is incorporated herein by reference in its entirety.

TECHNICAL FIELD

The present invention relates to a copolymer polyester heat-shrinkable film with excellent thermal resistance. More specifically, the present invention relates to an MDO (machine direction orientation) heat-shrinkable film that has an excellent shrink property so as to be effectively used for labels, cap seals, direct packaging, etc. of various containers through MD (machine direction) orientation.

BACKGROUND OF THE INVENTION

Heat-shrinkable plastic products use heat-shrink properties, and are widely used for films such as shrink packaging, shrink labels, etc. Among them, polyvinylchloride (PVC), polystyrene, polyester-based plastic films, etc. have been used for labels, cap seals, or direct packaging of various containers, etc.

However, a film consisting of polyvinylchloride is subject to regulations because there is a problem of generating hydrogen chloride gas and dioxin-causing materials during incineration. Further, if the product is used as a shrink label of a PET container, etc., there is inconvenience in that the label and container should be separated when the container is recycled. A polystyrene-based film has good operation stability according to a shrink process and has a good product appearance, but due to poor chemical resistance, ink of a special composition should be used when printing thereon. Furthermore, it has a disadvantage in that it is shrinks by itself due to insufficient storage stability at room temperature, thus causing size deformation.

In addition, common heat-shrinkable films are produced by TDO (transverse direction orientation), wherein a label film is produced by the orientation of extruded resin in the transverse direction (opposite direction to the flow coming out during extrusion), introduced in the upper and lower direction of the container and attached, and then passed through a heat-shrink tunnel. Particularly, such a TDO (transverse direction orientation) film requires complicated processes of primary slitting, printing, secondary slitting, seaming or sealing, labeling, etc. Thus, there is a demand for the development of an MDO (machine direction orientation) shrink film that can simplify the complicated processes of film production and can be produced to be thinner.

Furthermore, in case a processing temperature when printing is high in the process of printing a shrink label prepared from a shrink film, or a container or film is exposed to heat such as injecting a high temperature (60° C. to 70° C.) beverage, etc. into the container using the label, shrinkage and deformation may be generated in the shrink label, and thus it may be crooked unlike the intended form of the label.

Therefore, there is a demand for studies on a copolymer polyester resin with improved thermal resistance that is shrunken through MD (machine direction) orientation instead of the conventional orientation method.

DETAILS OF THE INVENTION

Objects of the Invention

It is an object of the present invention to provide a copolymer polyester MDO (machine direction orientation) heat-shrinkable film with improved thermal resistance wherein the maximum shrinkage at 75° C. is less than 5%, and is shrinkable by 30% or more at 100° C., through MD orientation instead of the conventional TD orientation method.

Means for Achieving the Object

The present invention provides an MDO thermoresistant heat-shrinkable film consisting of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component.

The MDO thermoresistant heat-shrinkable film of the copolymer polyester resin may have a shrink initiation temperature of 70° C. or more, maximum heat shrinkage at 75° C. of less than 5%, and the maximum heat shrinkage at 95 to 100° C. of 30% to 65%.

In addition, the acid component may further include one or more selected from the group consisting of a C8-14 aromatic dicarboxylic acid component and a C4-12 aliphatic dicarboxylic acid component.

The diol component may further include one or more selected from the group consisting of neopentyl glycol, ethylene glycol, diethylene glycol, and polyglycol. The film may be prepared by 1.1 to 3 times orientation in the MD (machine direction).

The total thickness of the copolymer polyester MDO thermoresistant heat-shrinkable film may be 10 to 60 μm.

The present invention also provides an MDO thermoresistant heat-shrinkable film consisting of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component, and the total thickness of the film is 10 to 60 μm.

The present invention also provides an MDO thermoresistant heat-shrinkable multilayer film consisting of multiple layers of the same materials using the above-explained copolymer polyester resin. The MDO thermoresistant heat-shrinkable multilayer film includes a substrate layer, and a skin layer on at least one side of the upper side and the lower side of the substrate layer, wherein the substrate layer and the skin layer consist of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component. Herein, the glass transition temperature of the copolymer polyester resin included in the skin layer may be 85° C. or more, and preferably, 90° C. or more.

The skin layer may further include one or more additives selected from the group consisting of a processing aid, an electrostatic agent, a UV absorber, a heat stabilizer, an antistatic agent, a pigment, a flame retardant, a thickener, and an antiblocking agent, or an antistatic agent-treated thermoresistant-treated coating layer may be added. The skin layer or coating layer including such additives may consist of one or more layers.

The present invention also provides a container including a label consisting of the above-described MDO thermoresistant heat-shrinkable film or MDO thermoresistant heat-shrinkable multilayer film of the copolymer polyester resin.

Effects of the Invention

According to the present invention, by optimizing the number average molecular weight of a resin while simultaneously optimizing the composition and the content ratio of a diol component, a heat-shrinkable film that not only has excellent thermal resistance compared to the conventional copolymer polyester, but also has an excellent shrink property so as to be effectively use for labels, cap seals, direct packaging, etc. of various containers, with maximum heat shrinkage being 30% to 65%, through MD orientation, can be provided.

DETAILED DESCRIPTION OF THE EMBODIMENTS

As used herein, the terms "first", "second" and the like are used to explain various constructional elements, and they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise", "have", etc. are intended to designate the existence of practiced characteristics, numbers, steps, constructional elements, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to specific disclosures, and that the present invention includes all the modifications, equivalents, or replacements thereof without departing from the spirit and technical scope of the invention.

Hereinafter, an MDO thermoresistant heat-shrinkable film of copolymer polyester according to preferable embodiments of the present invention will be explained in more detail.

According to one embodiment of the present invention, an MDO thermoresistant heat-shrinkable film consisting of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component, is provided.

Particularly, the present invention relates to an MDO (machine direction orientation) thermoresistant film that is newly suggested so as to overcome commonly known complicated processes of TDO heat-shrinkable films, and is characterized in that it can be used for labels, cap seals, direct packaging, etc. of various containers, and has excellent thermal resistance, etc.

The heat-shrinkable film is an MDO (machine direction orientation) film, and since a label film is produced by orientation in the length direction or machine direction of extruded resin (the flow direction during extrusion), a separate slitting process is not required before attaching to a container, and there is no need to change the direction of the oriented film for use as a shrink film, the total process and space efficiency may increase, and the productivity may be improved.

In the MDO thermoresistant heat-shrinkable film of the present invention, the polyester resin includes isosorbide and 1,4-cyclohexanedimethanol as diol components, wherein the content ratio of isosorbide (ISB) and 1,4-cyclohexanedimethanol (CHDM) (ISB/CHDM) is 0.1 or more to 2.5 or less, preferably 0.11 or more to 2.2 or less, or 0.12 or more to 2.0 or less. If the content ratio of isosorbide and 1,4-cyclohexanedimethanol is greater than 2.5, since the content of isosorbide is high compared to 1,4-cyclohexanedimethanol, brittleness may increase, the orientation ratio may decrease, and thus the maximum shrinkage may decrease. In addition, if the content ratio of isosorbide and 1,4-cyclohexanedimethanol is less than 0.1, a shrink initiation temperature may decrease due to low thermal resistance, and thermal deformation may be generated during molding and post-processing.

Among the diol components, as 1,4-cyclohexanedimethanol, cis-, trans-, or a mixture of both isomers may be used. The content of 1,4-cyclohexanedimethanol may be about 20 mol % to 60 mol %, preferably about 22 mol % to 58 mol %, or about 25 mol % to 55 mol %, based on the total diol components. If the content of 1,4-cyclohexanedimethanol is less than about 20 mol %, the properties may be deteriorated because tensile strength of the molded product (sheet/film) may be insufficient and elongation may be lowered, use as a shrink film may be limited because the orientation ratio may be low and the maximum shrinkage may decrease to 30% or less, and there is a high risk of deformation or breakage by ink during a printing process because chemical resistance may decrease. If the content of 1,4-cyclohexanedimethanol is greater than about 60 mol %, thermal resistance may be deteriorated because the content of isosorbide relatively decreases, and poor formability may be generated due to crystallization. Further, a force generated while a shrink film is shrunken may increase, and thus, if the shrink film is used for a product with a thin thickness, a molding defect rate with a product being crushed may increase.

In addition, among the diol components, the content of isosorbide may be 2 mol % to 40 mol %, preferably 3.5 mol % to 35 mol %, based on the total diol components. The isosorbide may be included in the above content range so as to improve thermal resistance, maximum shrinkage, shrink initiation temperature, etc., and prevent brittleness and thermal deformation during molding and post-processing, etc.

Meanwhile, the acid component used in the present invention includes terephthalic acid as a main component. That is, the whole acid component may be the terephthalic acid component, or the acid component may further include one or more selected from the group consisting of a C8-14 aromatic dicarboxylic acid component and a C4-12 aliphatic dicarboxylic acid component, in addition to terephthalic acid, so as to improve the properties of the polyester resin.

The C8-14 aromatic dicarboxylic acid component may include aromatic dicarboxylic acid components commonly used in the preparation of a polyester resin such as isophthalic acid, a naphthalenedicarboxylic acid such as 2,6-naphthalenedicarboxylic acid, etc., a diphenyl dicarboxylic acid, etc., excluding terephthalic acid. In addition, the C4-12 aliphatic dicarboxylic acid component may include linear, branched, or cyclic aliphatic dicarboxylic acid components commonly used in the preparation of polyester resin such as cyclohexanedicarboxylic acid such as 1,4-cyclohexanedicarboxylic acid, 1,3-cyclohexanedicarboxylic acid, etc., phthalic acid, sebacic acid, succinic acid, isodecyl succinic acid, maleic acid, fumaric acid, adipic acid, glutaric acid, azelaic acid, etc.

The acid component may be used alone or in combinations of two or more. Throughout the specification, the term 'terephthalic acid component' is used to include terephthalic acid, alkyl ester (a C1-4 lower alkyl ester such as monomethyl, monoethyl, dimethyl, diethyl, dibutyl ester, etc.), and/or an acid anhydride thereof, and it reacts with the diol components to form a terephthaloyl moiety. Throughout the specification, the acid moiety and the diol moiety mean residues that remain after hydrogen, hydroxyl groups, or alkoxy groups are removed during the common polyester polymerization reaction of the acid component and the diol component.

The diol component used in the present invention essentially includes isosorbide and 1,4-cyclohexanedimethanol, and may further include one or more selected from the group consisting of neopentyl glycol, ethylene glycol, diethylene glycol, and polyglycol.

Particularly, in order to improve formability or other properties of a polymer, the diol component may optionally include diethylene glycol, etc. Here, the content of diethylene glycol may be about 0.1 mol % to 15 mol %, preferably about 0.5 mol % to 10 mol %, based on the total diol component. When diethylene glycol is used, if the content is too low, the orientation level may decrease due to low elongation, and there is a risk of deformation of the molded product labeled with the shrink film due to a high shrink force, and if the content is too high, thermal resistance may be deteriorated, and the color of the molded product may become yellow.

The diol component used in the present invention, i.e., isosorbide and 1,4-cyclohexanediolmethanole, and neopentyl glycol, ethylene glycol, diethylene glycol, polyglycol, etc., may be included so that the total content may become 100 mol %.

Further, in the copolymer polyester resin of the present invention, if necessary, one or more of the following diol components may be additionally used. The diol components that can be used may include propane-1,2-diol, 2,2-methyl-1,3-propanediol, 2-methyl-1-3-propanediol, 2-dimethyl-1,3-propanediol, 2-methyl-2-ethyl-1,3-propanediol, 2-methyl-isopropyl-1,3-propanediol, 2-methyl-2-n-propyl-1,3-propanediol, 1,1-ethyl-n-butyl-1,3-propanediol, 2-n-propyl-2-n-butyl-1,3-propanediol, 2,2-di-n-propyl-1,3-propanediol, 2-ethyl-n-propyl-1,3-propanediol, 2-ethyl-isopropyl-1,3-propanediol, 2-methyl-n-butyl-1,3-propanediol, 2,2-diethyl-1,3-propanediol, 1,4-butanediol, 2,3-dimethyl-1,4-butanediol, 2-methyl-1,4-butanediol, 2-ethyl-1,4-butanediol, 2,3,4-trimethyl-1,5-pentanediol, 2-methyl-2-hexyl-1,3-propanediol, 2-butyl-2-ethyl-1,3-propanediol, 3-methyl-1,5-pentanediol, 2-methyl-1,5-pentanediol, 2-methyl-2-hexyl-1,3-propanediol, 2,3-dimethyl-2,3-butanediol, 1,6-hexanediol, 2,2,4,4-tetramethyl-1,3-cyclobutanediol, a polyethylene glycol such as triethylene glycol, etc., an ether glycol or dimer diol such as alkylene oxide of polypropylene glycol, polyoxy tetramethylene glycol, bisphenol compounds or derivatives thereof, etc. The content of the diol component added may be controlled so that the sum of the total diol components becomes 100 mol %, within a range where the properties of the polyester resin are not damaged.

Meanwhile, the copolymer polyester resin used in the present invention is prepared through the esterification reaction (first step) and polycondensation reaction (second step). The first step of the esterification reaction may be conducted batchwise or continuously, and although each raw material (acid component and diol component) may be separately introduced, it is most preferable that the acid component is made in the form of a slurry and introduced into the diol component.

Specifically, in the polymerization method of the copolymer polyester resin, primarily, based on the acid component including terephthalic acid, etc., the total diol components are introduced at the mole ratio of about 1.1 to 3.0, and the esterification reaction is conducted at a temperature of about 200 to 300° C., preferably about 220 to 290° C., or 240 to 280° C., and under a pressure condition of about 0.1 to 3.0 kg/cm', preferably about 0.2 to 3.0 kg/cm'. If the ratio of the diol component/acid component is less than about 1.1, an unreacted acid component may remain during the polymerization reaction, and transparency of the resin may be deteriorated, and if it is greater than about 3.0, the polymerization reaction speed may become too slow, and thus productivity of resin may be deteriorated.

If the preparation process of the copolymer polyester resin is divided into an esterification reaction (step 1) and a polycondensation reaction (step 2), a catalyst is not required in the esterification reaction, but a catalyst may be introduced so as to shorten the reaction time.

After completion of the esterification reaction (step 1), the polycondensation reaction (step 2) is conducted, and before initiating the polycondensation reaction (step 2), a polycondensation catalyst, a stabilizer, a coloring agent, etc. may be added to the product of the esterification reaction. As the polycondensation catalyst, one or more of commonly used titanium, germanium, antimony, aluminum, tin-based compounds, etc. may be appropriately selected and used. As the stabilizer added in the polycondensation reaction, in general, phosphorous compounds such as phosphoric acid, trimethylphosphate, triethylphosphate, etc. may be used. The added amount of the stabilizer is about 10 to 100 ppm based on the weight of the final polymer, on the basis of the phosphorous amount. If the amount of the stabilizer is less than about 10 ppm, the stabilization effect may be insufficient, and there is a concern that the color of the polymer may turn yellow. Also, if the amount of the stabilizer is greater than about 100 ppm, there is a concern that a polymer of a desired high polymerization degree may not be obtained. In addition, as the coloring agent added so as to improve the color of the polymer, commonly used coloring agents such as cobalt acetate, cobalt propionate, etc. may be mentioned, and if necessary, organic compound coloring agents may be used, and the added amount may be about 0 to 100 ppm based on the weight of the total polymer.

Particularly, since the organic compound coloring agent is more heat and humidity-stable, it is more favorable in terms of color stability of the molded product over time.

In general, the polycondensation reaction is conducted at a temperature of about 260 to 290° C., preferably about 260 to 280° C., or about 265 to 275° C., and under reduced pressure of about 400 to 0.1 mmHg. The condition of reduced pressure of about 400 to 0.1 mmHg is to remove glycol, which is a by-product of the polycondensation reaction. The polycondensation reaction is conducted until a desired intrinsic viscosity is reached.

However, the copolymer polyester resin should have a number average molecular weight of about 18,000 g/mol or more, or about 18,000 g/mol to about 100,000 g/mol, so as to maintain the strength and shrinkage of the molded product. The number average molecular weight of the copolymer polyester resin may preferably be about 19,000 g/mol or more, about 19,000 g/mol to 100,000 g/mol, about 20,000 g/mol or more, or about 20,000 g/mol to 100,000 g/mol. If the number average molecular weight distribution of the resin is high, polymer chain entanglement may be increased under the same Tg, thus generating more residual stress, thereby increasing maximum shrinkage.

The MDO thermoresistant heat-shrinkable film according to the present invention may include additives such as a processing aid, an electrostatic agent, an antistatic agent, a pigment, a flame retardant, a thickener, an antiblocking agent, etc. as necessary, in the content of about 1 to 5 wt % based on the total weight of the resin component, and within the above range, film forming may become easy and various properties may be provided to the film.

Further, if the additives used are inorganic particles, for example, silica-based inorganic particles, the average particle diameter is appropriately about 10 μm or less, more preferably about 5 μm or less so as to maintain the transparency of the film.

Although a common shrink film process of TDO is progressed by printing, cutting, seaming or sealing, and labeling, since the MDO film does not separately require a seaming process, the process is simple, thus reducing processing cost and increasing productivity.

Particularly, the MDO is a process in which a molded sheet is oriented in the MD with a speed difference of various rolls to manufacture a shrink film, and the TDO is a process in which a sheet molded and coming out in the MD is oriented in a TD (transverse direction), which is the opposite direction of the MD (machine direction), wherein unlike the MDO forming method, a sheet is placed in a grip and the orientation temperature, orientation speed, and orientation ratio are changed to form a film. Thus, in the case of TDO, the size of an orientation machine should become as large as the orientation ratio, but in the case of MDO, many rolls are positioned vertically or horizontally at narrow intervals, and only the speeds thereof are modified to control the orientation ratio, and thus there is a difference in the space required during molding. In the case of TDO, in order to apply the oriented film to a product such as a shrink film, the processes of cutting the film and adhering with an adhesive, and then labeling from the top to the bottom are additionally required because the orientation direction is opposite to the direction surrounding the product, but in the case of MDO, it can be directly applied to a product, and as a seaming process is not additionally required, the processing process is simple, the productivity is high, and defect fraction during labeling is low. Thus, in terms of the processing cost, productivity, and defect fraction, the MDO film is more stable and efficient than with TDO.

Such MDO thermoresistant heat-shrinkable film of a copolymer polyester of the present invention may exhibit excellent thermal resistance. Particularly, the shrink initiation temperature of the film may be about 70° C. or more or about 70° C. to 85° C., and preferably about 72° C. or more or about 72° C. to 85° C. The maximum heat shrinkage at about 75° C. of the film may be less than about 5%, 0% to less than about 5%, about 4.9% or less, 0% to about 4.9%, preferably about 4.5% or less, or 0% to about 4.5%. The maximum heat shrinkage at about 95 to 100° C. of the film may be about 30% to 65%. The glass transition temperature of the MDO thermoresistant heat-shrinkable film may be about 90° C. or more or about 90° C. to 130° C.

The thickness of the MDO thermoresistant heat-shrinkable film according to the present invention may be about 10 to 60 μm, preferably about 20 to 45 μm, and more preferably about 25 to 35 μm, and it can be produced with a thickness of about 40 to 80 μm thinner than a common TDO shrink film. If the total thickness of the MDO thermoresistant heat-shrinkable film falls within the above range, it can be produced with a thinner thickness compared to TDO heat-shrinkable films, and thus a cost reduction effect may be obtained. The reason is that the process of manufacturing a shrink film is different between TDO and MDO. That is, since a label film is produced by orientation in the transverse direction (opposite direction to the flow coming out during extrusion) of the extruded sheet, a label is introduced in the upper and lower direction of the container in label packaging machine and attached, and thus, the film should be made into a cylindrical shape, and the thickness of the film should be thick. However, in the case of the MDO thermoresistant heat-shrinkable film of the present invention, since the film is oriented in the same direction as the flow direction of the extruded sheet, spun in a circle and wound, and then a label is directly attached, the thickness of the film can be thin, thus more films can be manufactured with the same amount of raw materials.

Particularly, even if a copolymer polyester resin of the same composition is used, in the case of a TDO heat-shrinkable film, the thickness of a moldable film is thicker than the MDO film, and thus, when oriented at the same orientation ratio, maximum shrinkage is lower. The reason why the thickness of the TDO heat-shrinkable film is thick is that the film should be cut and seamed and then labeled from the top to the bottom so as to change the direction of the oriented film to the direction of a product that needs to be shrunken. During the process, if the thickness of the film is thin, a part of the product may be wrinkled and a defect or breakage may frequently occur, and thus, in general, the TDO film is formed with a greater thickness than the MDO shrink film. Further, property differences between the MDO shrink film and the TDO shrink film are generated because the orientation degree of the polymer is different, even if they consist of identical resins. In the case of MDO, compared to TDO, the sheet has a larger tolerance force and thus is stronger, and the defect fraction is low even during a rapid process. Thus, a heat-shrink degree of a film varies according to the thickness of the film, and compared to a thick film, a thin film has a low shrink degree and the shrinkage is measured to be low, such that the TDO oriented film and the MDO oriented film have different properties even if they consist of identical resins.

Specifically, it is preferable that the barrel temperature of an extruder is adjusted to about 220 to about 280° C., and it is more preferable that the temperature of polymer is adjusted to the range of about 240 to 270° C. Thereafter, the polymer is extruded from a T-die, and then cooled by a cooling roller adjusted to about 40 to 70° C. for take-off.

Thereafter, it is oriented by about 1.1 to 3 times in the MD by a speed ratio of a low speed roller and a high speed roller in a roller orientation device adjusted to about 80 to 140° C., and wound in a winder to obtain a film roll.

Meanwhile, the MD orientation device may consist of a preheating roller, an orientation roller, an annealing roller, and a cooling roller. The temperature of the roller orientation device may be generally set to be about 10 to about 30° C. higher than the glass transition temperature for the preheating roller, about 5 to 20° C. higher for the orientation roller, about 10 to 30° C. lower for the annealing roller, and about 20 to 50° C. lower for the cooling roller, and as the result, uniform orientation is enabled, thus minimizing a deviation.

By different speeds of the orientation rollers, the orientation ratio can be controlled, and for example, when the speed ratio between the first orientation roller and the second orientation roller is about 1:12 to 1:5, preferably about 1:15 to 1:3, the strength and shrinkage of the MDO heat-shrinkable film can be improved.

Further, the printing method using the MDO thermoresistant heat-shrinkable film of copolymer polyester of the present invention is largely divided into a raised printing method and an intaglio printing method, and the printing temperature differs according to the printing method. The printing temperature of the intaglio printing is about 40° C. to 45° C. and the printing may be progressed at a processing temperature about 62° C. to 65° C. lower than the raised printing temperature, but in the case of the intaglio printing method, the processing cost of a design frame is relatively high, which may be a limitation to the application. Thus, due to the processing cost burden, in the case of small quantity batch production, the raised printing method is mainly used, and thus the MD shrink film with thermal resistance that is not deformed below the printing temperature has an advantage in that the applicable field is broadened. Further, with the tendency toward lighter weight bottles, the thickness thereof is increasingly being reduced, and deformation may be generated due to the influence of the heat source of the contents of a shrink film, such that an MD shrink film with improved thermal resistance is required for high temperature filling of 60 to 70° C.

The MDO thermoresistant heat-shrinkable film and the preparation method thereof may further include components, compositions, process steps, etc. that are commonly used in the technical field to which the present invention pertains, in addition to the above-explained components, compositions, and process steps.

Meanwhile, according to another embodiment of the present invention, an MDO thermoresistant film using the above-explained copolymer polyester resin is provided. The MDO thermoresistant film consists of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component. Further, the total thickness of the MDO thermoresistant film is about 10 to 60 μm.

The composition, properties, preparation method, etc. of the copolymer polyester resin are as explained above.

According to yet another embodiment of the present invention, an MDO thermoresistant heat-shrinkable multilayer film consisting of multilayers of the same materials using the above-explained copolymer polyester resin is provided. The MDO thermoresistant heat-shrinkable multilayer film includes a substrate layer, and a skin layer on at least one side of the upper side and the lower side of the substrate layer, wherein the substrate layer and the skin layer consist of a copolymer polyester resin having a number average molecular weight of 18,000 g/mol or more, which is formed by copolymerization of an acid component including terephthalic acid and a diol component, and has a structure wherein an acid moiety derived from the acid component and a diol moiety derived from the diol component are repeated, wherein the diol component includes isosorbide and 1,4-cyclohexanedimethanol, the content ratio of isosorbide (ISB) and 1,4-cyclohexanedimethanol (CHDM) (ISB/CHDM) is 0.1 to 2.5, and the content of the 1,4-cyclohexanedimethanol is 20 mol % to 60 mol % of the total diol component. Here, the glass transition temperature of the copolymer polyester resin included in the skin layer may be about 85° C. or more, and more preferably, about 90° C. or more.

The composition, properties, and preparation method of the copolymer polyester resin are as explained above.

Particularly, the skin layer may further include one or more functional additives selected from the group consisting of a processing aid, an electrostatic agent, a UV absorber, a heat stabilizer, an antistatic agent, pigment, a flame retardant, a thickener, and an antiblocking agent. Alternatively, an antistatic agent treated thermoresistant-treated coating layer may be added to the skin layer, and a coating layer further including one or more additives selected from the group consisting of a processing aid, an electrostatic agent, a UV absorber, a heat stabilizer, an antistatic agent, pigment, a flame retardant, a thickener, and an antiblocking agent may be further included on the skin layer. The skin layer or coating layer including such additives may consist of one or more layers, for example, 5 to 7 layers. The functional additives may be used in a content of about 1 to 5 wt % based on the total weight of the resin components of the skin layer of the coating layer, and within such range, the film may be easily molded and various properties may be provided to the film.

According to yet another embodiment of the present invention, a container including the above-explained MDO thermoresistant heat-shrinkable film or MDO thermoresistant heat-shrinkable multilayer film of the copolymer polyester resin as a shrinkable label, is provided. The container has excellent heat stability because the heat-shrinkable label is not deformed even if high temperature products are filled therein.

Hereinafter, preferable examples are presented for better understanding of the present invention, but the following examples are presented only to illustrate of the present invention, and the scope of the present invention is not limited thereby.

EXAMPLES

Example 1

A polyester resin copolymerized using 100 mol % of terephthalic acid, and based on the total amount of diol components, 48 mol % of 1,4-cyclohexanedimethanol (CHDM), 15 mol % of isosorbide (ISB), and the remaining amount of ethylene glycol (EG) was mixed in a 3 kg batch reactor and reacted while slowly raising the temperature to about 260° C.

Generated water was discharged outside of the system to progress an ester reaction. When the generation and discharge of water was finished, the reactant was transferred to a polycondensation reactor, to which a stirrer, a cooling condenser, and a vacuum system were attached. A catalyst, a stabilizer, and a coloring agent were added to the esterification reactant at an appropriate ratio. Then, while raising the temperature inside of the reactor to about 240° C. to 275° C., the pressure was primarily reduced from atmospheric pressure to about 50 mmHg to remove ethylene glycol with a low vacuum reaction for about 20 minutes, and slowly reduced again to about 0.1 mmHg. The polycondensation reaction was progressed under high vacuum until a desired intrinsic viscosity was reached, thus preparing a copolymer polyester resin.

Using the prepared copolymer polyester resin, an MDO thermoresistant shrink film was prepared.

Example 2

A heat-shrinkable film was prepared by the same method as in Example 1, except that 100 mol % of terephthalic acid, and based on the total amount of diol components, 48 mol % of 1,4-cyclohexanedimethanol (CHDM), 38 mol % of isosorbide (ISB), and the remaining amount of ethylene glycol were reacted.

Example 3

A heat-shrinkable film was prepared by the same method as in Example 1, except that 100 mol % of terephthalic acid, and based on the total amount of diol components, 50 mol % of 1,4-cyclohexanedimethanol, 22 mol % of isosorbide, 3 mol % of diethylene glycol, and the remaining amount of ethylene glycol were reacted.

Example 4

A heat-shrinkable film was prepared by the same method as in Example 1, except that 100 mol % of terephthalic acid, and based on the total amount of diol components, 48 mol % of 1,4-cyclohexanedimethanol, 10 mol % of isosorbide, and the remaining amount of ethylene glycol were reacted.

Example 5

A heat-shrinkable film was prepared by the same method as in Example 1, except that 100 mol % of terephthalic acid, and based on the total amount of diol components, 45 mol % of 1,4-cyclohexanedimethanol, 53 mol % of isosorbide, 1.5 mol % of diethylene glycol, and the remaining amount of ethylene glycol were reacted.

Comparative Example 1

A heat-shrinkable film was prepared by the same method as in Example 1, except that 100 mol % of terephthalic acid, and based on the total amount of diol components, 48 mol % of 1,4-cyclohexanedimethanol, 8 mol % of isosorbide, and the remaining amount of ethylene glycol were reacted.

Comparative Example 2

A heat-shrinkable film was prepared by the same method as in Example 1, except that 100 mol % of terephthalic acid, and based on the total amount of diol components, 30 mol % of 1,4-cyclohexanedimethanol, 2 mol % of diethylene glycol, and the remaining amount of ethylene glycol were reacted.

Comparative Example 3

A heat-shrinkable film was prepared by the same method as in Example 1, except that 100 mol % of terephthalic acid, and based on the total amount of diol components, 15 mol % of 1,4-cyclohexanedimethanol, 17 mol % of isosorbide, and the remaining amount of ethylene glycol were reacted.

Comparative Example 4

Using the same composition as Example 1, a low viscosity copolymer polyester resin with a low number average molecular weight was prepared, and a heat-shrinkable film was prepared using the same.

Experimental Example

For the copolymer polyester resin and heat-shrinkable films prepared according to Examples 1 to 5 and Comparative Examples 1 to 4, the properties were evaluated as follows.

a) Compositional Analysis (NMR)

It was measured through a Fourier-transform (for higher resolution and faster scanning) mode using ECA 600, Jeol (600 MHz, H-NMR) equipment. For the pretreatment of the sample, about 15 mg of a pellet sample was placed in an NMR tube (quartz, NMR inactive), and about 0.7 mL of chloroform was placed therein to dissolve the sample, which was used for analysis.

The measurement result was the composition result of diol components based on 100 mol % of acid, and shown in the following Table 1 as a diol component. For reference, a trace amount of diethylene glycol (DEG) was detected due to side reactions, even if not introduced. In general, generation of DEG is known as one of common side-reaction results of polyester polymerization.

b) Molecular Weight Distribution (GPC)

Using a Tosoh instrument, after pretreatment with an O—CP (o-chlorophenol):$CHCl_3$=1:3 solvent at about 150° C. for about 15 minutes, the molecular weight distribution was measured with a Shodex LF804 column (2ea) (temperature: about 40° C., flow rate: about 0.7 mL/min, solvent amount: about 12 mL, sample amount: about 0.03 g).

c) Chip Color

The chip color was measured using the facilities of Konica Minolta (CM-3600A) according to ASTM E 1164.

The chip was put in a CM-A99 (20 mm) quartz holder, and the Col-L/Col-b value of absolute, 10 degrees, and Hunter D65 were obtained.

d) Thermal Property (Tg)

The thermal property was measured using Mettler Toledo Differential Scanning calorimetry of TA instruments.

Here, the temperature rise speed was about 10° C./min, and $2^{nd}$ Tg value excluding thermal history was shown.

e) Thickness of Molded Product (Film)

The thickness of the oriented MDO film was measured using a digital vernier caliper of Mitutoyo Corporation.

f) Deformation of Molded Product (Film) Under 65° C. Condition

Since a raised printing temperature was about 62° C. to about 65° C., and the temperature during high temperature filling of a beverage was about 60° C. to about 70° C., the deformation rate of the MD oriented film was confirmed under the condition of a mean temperature of about 65° C., to evaluate thermal resistance.

Here, the film was cut into squares of about 10 cm×10 cm, and put in a water bath of about 65° C. for about 15 to about 30 seconds to confirm whether or not deformation occurred.

g) Heat Shrinkage (%, 75° C., 100° C.)

The film was cut into squares of 10 cm×10 cm, and put in a water bath for about 15 to about 30 seconds at a temperature of about 75° C. or about 100° C. as described below so as to be heat shrunken, and then a change in the machine direction length of the sample was measured. The heat shrinkage was calculated according to the following Formula 1.

Heat shrinkage (%)=100×(length before shrinking−length after shrinking)/(length before shrinking)   [Formula 1]

The results of measuring the properties of the copolymer polyester resin and heat-shrinkable films prepared according to Examples 1 and 5 are shown in the following Table 1.

TABLE 1

|  |  | Example 1 | Example 2 | Example 3 | Example 4 | Example 5 |
|---|---|---|---|---|---|---|
| Diol composition | ISB/CHDM ratio | 0.198 | 0.479 | 0.26 | 0.125 | 0.733 |
|  | ISB (mol %) | 9.5 | 23 | 13 | 6 | 33 |
|  | CHDM (mol %) | 48 | 48 | 50 | 48 | 45 |
|  | DEG (mol %) | 1.2 | 1.5 | 5 | 1.4 | 4 |
|  | EG (mol %) | 41.3 | 27.5 | 32 | 44.6 | 18 |
| Number average molecular weight (Mn, g/mol) |  | 24,000 | 21,000 | 23,000 | 25,000 | 22,000 |
| Chip Color (L/b) |  | 65/−1.6 | 56/−1.5 | 64/−0.7 | 67/−2.3 | 54/−0.5 |
| Thermal property (Tg, ° C.) |  | 95 | 110 | 95 | 91 | 119 |
| Film thickness (μm) |  | 25 | 35 | 20 | 25 | 25 |
| Deformation of film at 65 (water) |  | No deformation | No deformation | No deformation | No deformation | No deformation |
| Shrinkage (%) | MD 75° C. | 1 | 0 | 1 | 4 | 0 |
|  | MD 100° C. | 36 | 31 | 60 | 39 | 30 |
|  | TD 100° C. | 2 | 0 | 3 | 2 | 0 |

Further, the results of measuring the properties of the copolymer polyester resin and the heat-shrinkable films prepared according to Comparative Examples 1 to 4 are shown in the following Table 2.

TABLE 2

|  |  | Comparative Example 1 | Comparative Example 2 | Comparative Example 3 | Comparative Example 4 |
|---|---|---|---|---|---|
| Diol composition | ISB/CHDM ratio | 0.094 | — | 0.667 | 0.188 |
|  | ISB (mol %) | 4.5 | 0 | 10 | 9 |
|  | CHDM (mol %) | 48 | 30 | 15 | 48 |
|  | DEG (mol %) | 1.5 | 3.3 | 1.5 | 1.2 |
|  | EG (mol %) | 46 | 66.7 | 73.5 | 41.8 |
| Number average molecular weight (Mn, g/mol) |  | 22,000 | 24,000 | 21,000 | 15,000 |
| Chip Color (L/b) |  | 67/−2.8 | 67/2.1 | 63/1.9 | 66/−1.7 |
| Thermal property (Tg, ° C.) |  | 89 | 80 | 85 | 94 |
| Film thickness (μm) |  | 25 | 25 | 30 | 30 |
| Deformation of film at 65 (water) |  | Deformed | Deformed | Deformed | No deformation |
| Shrinkage (%) | MD 75° C. | 8 | 62 | 23 | 1 |
|  | MD 100° C. | 34 | 65 | 28 | 24 |
|  | TD 100° C. | 2 | 1 | 1 | 0 |

As shown in Table 1, the MDO heat-shrinkable films of the copolymer polyester resin of Examples 1 to 5 prepared according to the present invention can reduce a cost by simplifying the preparation process through an MD orientation instead of a TD orientation. Also, the MDO heat-shrinkable films of the copolymer polyester resin of Examples 1 to 5 have excellent thermal resistance, wherein the maximum shrinkage of the film is less than 5% at 75° C., and is at least 30% at 100° C.

Particularly, Examples 1 and 4 are molded films of polyester resins respectively having a Tg of about 95° C. and about 91° C., and have characteristics of a thermoresistant shrink film wherein exterior deformation does not occur at the printing temperature of about 62 to 65° C. Examples 2 and 5 are films with excellent thermal properties because each Tg is higher than in Example 1. In the case of Example 3, the DEG content increased compared to Example 1, and as the DEG content increases, Tg decreases because polymer irregularities increase. Thus, it can be seen that the content of isosorbide which has an influence on thermal resistance was increased so as to increase the glass transition temperature, thus increasing thermal resistance. Further, although the chip color turned yellow due to DEG, elongation of the film was improved, and the orientation level increased, and thus the thickness of the final film was the thinnest and the maximum shrinkage was increased.

To the contrary, as shown in Table 2, in the case of the heat-shrinkable films of Comparative Examples 1 to 4 using the copolymer polyester resin prepared by the existing method, deformation occurred at a temperature of printing or the maximum shrinkage remarkably decreased. Particularly, in the case of Comparative Example 1, since the content ratio of ISB/CHDM was very low (0.094), due to the composition of the copolymer with a Tg of 89° C., the thermal resistance was lower than in Comparative Example 4 and shrinkage at 75° C. was as high as 8%, and exterior deformation occurred even at the printing temperature of 65° C. Comparative Example 2 had a polyester-based composition commonly used in an MDO shrink film, and had very high shrinkage of 62% at 75° C. due to a low Tg of 80° C., and as in Comparative Example 1, problems in terms of thermal resistance at a printing temperature of 65° C. and external faults by hot beverage injection, etc. occurred. Since Comparative Example 3 used a small content of CHDM (15 mol %), the maximum heat shrinkage at 100° C. decreased to 28% and the Tg decreased to 85° C., the maximum shrinkage at 75° C. was very high (23%), and problems in terms of thermal resistance at a printing temperature of 65° C. and exterior faults by hot beverage injection, etc. occurred. Particularly, since the CHDM provided an elastic property due to the structural characteristic of the monomers, in the content rate of 20 mol % or less, shrinkage was lowered and thermal resistance decreased. Further, in the case of Comparative Example 4 wherein the number average molecular weight was 15,000 g/mol, although thermal resistance was similar to that of Example 1, it was difficult to use it for a shrink film because the maximum shrinkage at 100° C. was very low (24%), and the final thickness of the molded product (film) became thick because the orientation level was lowered.

What is claimed is:

1. A machine direction orientation (MDO) thermoresistant heat-shrinkable film consisting of a copolymer polyester resin having a number average molecular weight of 18,000 g/mol or more, which is formed by copolymerization of an acid component comprising terephthalic acid and a diol component, and has a structure wherein an acid moiety derived from the acid component and a diol moiety derived from the diol component are repeated,
   wherein the diol component comprises isosorbide (ISB), 1,4-cyclohexanedimethanol (CHDM), diethylene glycol, and ethylene glycol,
   wherein a content ratio of isosorbide and 1,4-cyclohexanedimethanol (ISB/CHDM) is 0.1 to 2.5, a content of isosorbide is 3.5 mol % to 35 mol % of the total diol component, a content of 1,4-cyclohexanedimethanol is 25 mol % to 55 mol % of the total diol component, a content of diethylene glycol is 0.5 mol % to 10 mol % of the total diol component, and a content of ethylene glycol is a remainder of the total diol component.

2. The MDO thermoresistant heat-shrinkable film according to claim 1, wherein a shrink initiation temperature of the film is 70° C. or more, a maximum heat shrinkage at 75° C. is less than 5%, and a maximum heat shrinkage at 95° C. to 100° C. is 30% to 65%.

3. The MDO thermoresistant heat-shrinkable film according to claim 1, wherein the acid component further comprises one or more selected from the group consisting of a C8-14 aromatic dicarboxylic acid component and a C4-12 aliphatic dicarboxylic acid component.

4. The MDO thermoresistant heat-shrinkable film according to claim 1, wherein the film is prepared by 1.1 to 3 times orientation in the machine direction (MD).

5. The MDO thermoresistant heat-shrinkable film according to claim 1, wherein a total thickness of the film is 10 to 60 μm.

6. A container comprising a label consisting of the MDO thermoresistant heat-shrinkable film of the copolymer polyester resin according to claim 1.

7. The MDO thermoresistant heat-shrinkable film according to claim 1, wherein the content ratio of isosorbide and 1,4-cyclohexanedimethanol (ISB/CHDM) is 0.125 to 0.733.

8. The MDO thermoresistant heat-shrinkable film according to claim 1, wherein the content of isosorbide is 6 mol % to 33 mol % of the total diol component, the content of 1,4-cyclohexanedimethanol is 45 mol % to 50 mol % of the total diol component, the content of diethylene glycol is 1.2 mol % to 5 mol % of the total diol component, and the content of ethylene glycol is a remainder of the total diol component.

9. A machine direction orientation (MDO) thermoresistant heat-shrinkable film consisting of a copolymer polyester resin having a number average molecular weight of 18,000 g/mol or more, which is formed by copolymerization of an acid component comprising terephthalic acid and a diol component, and has a structure wherein an acid moiety derived from the acid component and a diol moiety derived from the diol component are repeated,
   wherein the diol component comprises isosorbide (ISB), 1,4-cyclohexanedimethanol (CHDM), diethylene glycol, and ethylene glycol,
   wherein a content ratio of isosorbide and 1,4-cyclohexanedimethanol (ISB/CHDM) is 0.1 to 2.5, a content of the isosorbide is 3.5 mol % to 35 mol % of the total diol component, a content of 1,4-cyclohexanedimethanol is 25 mol % to 55 mol % of the total diol component, a content of the diethylene glycol is 0.5 mol % to 10 mol % of the total diol component, a content of ethylene glycol is a remainder of the total diol component, and a total thickness of the film is 10 to 60 μm.

10. A machine direction orientation (MDO) thermoresistant heat-shrinkable multilayer film comprising a substrate layer, and a skin layer on at least one side of an upper side and a lower side of the substrate layer, wherein each of the substrate layer and the skin layer consists of a copolymer polyester resin having a number average molecular weight of 18,000 g/mol or more, which is formed by copolymerization of an acid component comprising terephthalic acid and a diol component, and has a structure wherein an acid moiety derived from the acid component and a diol moiety derived from the diol component are repeated, wherein the diol component comprises isosorbide (ISB), 1,4-cyclohexanedimethanol (CHDM), diethylene glycol, and ethylene glycol, wherein a content ratio of isosorbide and 1,4-cyclohexanedimethanol (ISB/CHDM) is 0.1 to 2.5, a content of the isosorbide is 3.5 mol % to 35 mol % of the total diol component, a content of 1,4-cyclohexanedimethanol is 25 mol % to 55 mol % of the total diol components, a content of the diethylene glycol is 0.5 mol % to 10 mol % of the total diol component, and a content of ethylene glycol is a remainder of the total diol component.

11. The MDO thermoresistant heat-shrinkable multilayer film according to claim 8, further comprising a coating layer comprising one or more additives selected from the group consisting of a processing aid, an electrostatic agent, a UV absorber, a heat stabilizer, an antistatic agent, a pigment, a flame retardant, a thickener, and an antiblocking agent, on the skin layer.

* * * * *